United States Patent
Calvin et al.

(10) Patent No.: US 10,896,145 B2
(45) Date of Patent: *Jan. 19, 2021

(54) COMMUNICATIONS CONTROL SYSTEM WITH A SERIAL COMMUNICATIONS INTERFACE AND A PARALLEL COMMUNICATIONS INTERFACE

(71) Applicant: Bedrock Automation Platforms Inc., Mansfield, MA (US)

(72) Inventors: James G. Calvin, Attleboro, MA (US); Albert Rooyakkers, Sunnyvale, CA (US); Pirooz Parvarandeh, Los Altos Hills, CA (US)

(73) Assignee: BEDROCK AUTOMATION PLATFORMS INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/948,418

(22) Filed: Apr. 9, 2018

(65) Prior Publication Data

US 2018/0300284 A1     Oct. 18, 2018

Related U.S. Application Data

(63) Continuation of application No. 15/491,562, filed on Apr. 19, 2017, now Pat. No. 9,940,296, which is a
(Continued)

(51) Int. Cl.
*G06F 13/14* (2006.01)
*G06F 13/42* (2006.01)
(Continued)

(52) U.S. Cl.
CPC ............ *G06F 13/4282* (2013.01); *G06F 1/26* (2013.01); *G06F 3/002* (2013.01); *G06F 13/00* (2013.01);
(Continued)

(58) Field of Classification Search
CPC .......... G06F 13/00; G06F 13/20; G06F 15/16; G06F 13/4282; G06F 13/14;
(Continued)

(56) References Cited

U.S. PATENT DOCUMENTS 1,778,549 A    10/1930  Conner
1,961,013 A     5/1934  Saraceno
(Continued)

FOREIGN PATENT DOCUMENTS

CN    2162746 Y    4/1994
CN    1408129 A    4/2003
(Continued)

OTHER PUBLICATIONS

International Search Report dated Apr. 29, 2013 for Appln. No. PCT/US2012/072056.
(Continued)

*Primary Examiner* — Henry Tsai
*Assistant Examiner* — Christopher A Daley
(74) *Attorney, Agent, or Firm* — Kevin E. West; Advent, LLP

(57) ABSTRACT

A communications control system is disclosed that includes a serial communications interface and a parallel communications interface for coupling a plurality of input/output modules with a control module. The serial communications interface is configured for connecting the plurality of input/output modules to the control module in parallel to transmit information between the plurality of input/output modules and the control module, and the parallel communications interface is configured for separately connecting the plurality of input/output modules to the control module to transmit information between the plurality of input/output modules and the control module, and to transmit information between individual ones of the plurality of input/output modules. The
(Continued)

serial communications interface may comprise a multidrop bus, and the parallel communications interface may comprise a cross switch.

17 Claims, 9 Drawing Sheets

Related U.S. Application Data continuation of application No. 15/289,613, filed on Oct. 10, 2016, now Pat. No. 9,632,964, which is a continuation of application No. 14/502,006, filed on Sep. 30, 2014, now Pat. No. 9,465,762, which is a continuation of application No. 13/341,176, filed on Dec. 30, 2011, now Pat. No. 8,868,813.

(51) Int. Cl.
    *G06F 13/00*     (2006.01)
    *G06F 1/26*     (2006.01)
    *G06F 13/40*     (2006.01)
    *G06F 3/00*     (2006.01)

(52) U.S. Cl.
    CPC .......... *G06F 13/14* (2013.01); *G06F 13/4022* (2013.01); *G06F 13/4208* (2013.01); *G06F 13/4221* (2013.01); *G06F 13/4217* (2013.01); *G06F 2213/0004* (2013.01); *G06F 2213/0022* (2013.01)

(58) Field of Classification Search
    CPC .... G06F 13/4022; G06F 1/26; G06F 13/4208; G06F 13/4217; G06F 13/4221; G06F 3/002; G06F 2213/0004; G06F 2213/0022
    See application file for complete search history.

(56) References Cited

U.S. PATENT DOCUMENTS

| | | |
|---|---|---|
| 2,540,575 A | 2/1951 | Finizie |
| 3,702,983 A | 11/1972 | Chace et al. |
| 4,079,440 A | 3/1978 | Ohnuma et al. |
| 4,082,984 A | 4/1978 | Iwata |
| 4,337,499 A | 6/1982 | Cronin et al. |
| 4,403,286 A * | 9/1983 | Fry .................. G06F 9/505 710/15 |
| 4,508,414 A | 4/1985 | Kusui et al. |
| 4,628,308 A | 12/1986 | Robert |
| 4,656,622 A | 4/1987 | Lea |
| 4,672,529 A | 6/1987 | Kupersmit |
| 4,691,384 A | 9/1987 | Jobe |
| 4,882,702 A | 11/1989 | Stuger et al. |
| 4,929,939 A | 5/1990 | Varma et al. |
| 4,932,892 A | 6/1990 | Hatch |
| 5,013,247 A | 5/1991 | Watson |
| 5,229,652 A | 7/1993 | Hough |
| 5,325,046 A | 6/1994 | Young et al. |
| 5,378,166 A | 1/1995 | Gallagher, Sr. |
| 5,385,487 A | 1/1995 | Beitman |
| 5,385,490 A | 1/1995 | Demeter et al. |
| 5,388,099 A | 2/1995 | Poole |
| 5,422,558 A | 6/1995 | Stewart |
| 5,469,334 A | 11/1995 | Balakrishnan |
| 5,519,583 A | 5/1996 | Kolling et al. |
| 5,546,463 A | 8/1996 | Caputo et al. |
| 5,590,284 A | 12/1996 | Crosetto |
| 5,602,754 A | 2/1997 | Beatty et al. |
| 5,603,044 A | 2/1997 | Annapareddy et al. |
| 5,719,483 A | 2/1998 | Abbott et al. |
| 5,724,349 A | 3/1998 | Cloonan et al. |
| 5,735,707 A | 4/1998 | O'Groske et al. |
| 5,773,962 A | 6/1998 | Nor |
| 5,860,824 A | 1/1999 | Fan |
| 5,896,473 A | 4/1999 | Kaspari |
| 5,909,368 A | 6/1999 | Nixon et al. |
| 5,951,666 A | 9/1999 | Ilting et al. |
| 5,958,030 A | 9/1999 | Kwa |
| 5,963,448 A | 10/1999 | Flood et al. |
| 5,980,312 A | 11/1999 | Chapman et al. |
| 6,009,410 A | 12/1999 | LeMole et al. |
| 6,046,513 A | 4/2000 | Jouper et al. |
| 6,124,778 A | 9/2000 | Rowley et al. |
| 6,178,474 B1 | 1/2001 | Hamano et al. |
| 6,219,789 B1 | 4/2001 | Little et al. |
| 6,220,889 B1 | 4/2001 | Ely et al. |
| 6,347,963 B1 | 2/2002 | Falkenberg et al. |
| 6,393,565 B1 | 5/2002 | Lockhart et al. |
| 6,435,409 B1 | 8/2002 | Hu |
| 6,453,416 B1 | 9/2002 | Epstein |
| 6,480,963 B1 | 11/2002 | Tachibana et al. |
| 6,490,176 B2 | 12/2002 | Holzer et al. |
| 6,574,681 B1 | 6/2003 | White et al. |
| 6,597,683 B1 | 7/2003 | Gehring et al. |
| 6,643,777 B1 | 11/2003 | Chu |
| 6,680,904 B1 | 1/2004 | Kaplan et al. |
| 6,695,620 B1 | 2/2004 | Huang |
| 6,799,234 B1 | 9/2004 | Moon et al. |
| 6,812,803 B2 | 11/2004 | Goergen |
| 6,814,580 B2 | 11/2004 | Li et al. |
| 6,828,894 B1 | 12/2004 | Sorger et al. |
| 6,840,795 B1 | 1/2005 | Takeda et al. |
| 6,988,162 B2 | 1/2006 | Goergen |
| 7,164,255 B2 | 1/2007 | Hui |
| 7,172,428 B2 | 2/2007 | Huang |
| 7,200,692 B2 | 4/2007 | Singla et al. |
| 7,234,963 B1 | 6/2007 | Huang |
| 7,254,452 B2 | 8/2007 | Davlin et al. |
| 7,402,074 B2 | 7/2008 | LeBlanc et al. |
| 7,415,368 B2 | 8/2008 | Gilbert et al. |
| 7,426,585 B1 | 9/2008 | Rourke |
| 7,460,482 B2 | 12/2008 | Pike |
| 7,510,420 B2 | 3/2009 | Mori |
| 7,526,676 B2 | 4/2009 | Chou et al. |
| 7,529,862 B2 * | 5/2009 | Isani ................ G06F 13/28 710/110 |
| 7,536,548 B1 | 5/2009 | Batke et al. |
| 7,554,288 B2 | 6/2009 | Gangstoe et al. |
| 7,587,481 B1 | 9/2009 | Osburn, III |
| 7,614,909 B2 | 11/2009 | Lin |
| 7,619,386 B2 | 11/2009 | Sasaki et al. |
| 7,622,994 B2 | 11/2009 | Galal |
| 7,660,998 B2 | 2/2010 | Walmsley |
| 7,670,190 B2 | 3/2010 | Shi et al. |
| 7,685,349 B2 | 3/2010 | Allen et al. |
| 7,730,304 B2 | 6/2010 | Katsube et al. |
| 7,746,846 B2 | 6/2010 | Boora et al. |
| 7,761,640 B2 * | 7/2010 | Hikabe ............... G06F 9/4411 710/300 |
| 7,774,074 B2 | 8/2010 | Davlin et al. |
| 7,790,304 B2 | 9/2010 | Hendricks et al. |
| 7,811,136 B1 | 10/2010 | Hsieh et al. |
| 7,815,471 B2 | 10/2010 | Wu |
| 7,822,994 B2 | 10/2010 | Hamaguchi |
| 7,839,025 B2 | 11/2010 | Besser et al. |
| 7,872,561 B2 | 1/2011 | Matumoto |
| 7,948,758 B2 | 5/2011 | Buhler et al. |
| 7,960,870 B2 | 6/2011 | Besser et al. |
| 7,971,052 B2 | 6/2011 | Lucas et al. |
| 8,013,474 B2 | 9/2011 | Besser et al. |
| 8,019,194 B2 | 9/2011 | Morrison et al. |
| 8,032,745 B2 | 10/2011 | Bandholz et al. |
| 8,062,070 B2 | 11/2011 | Jeon et al. |
| 8,125,208 B2 | 2/2012 | Gyland |
| 8,132,231 B2 | 3/2012 | Amies et al. |
| 8,143,858 B2 | 3/2012 | Tsugawa et al. |
| 8,149,587 B2 | 4/2012 | Baran et al. |
| 8,157,569 B1 | 4/2012 | Liu |
| 8,181,262 B2 | 5/2012 | Cooper et al. |
| 8,189,101 B2 | 5/2012 | Cummings et al. |
| 8,212,399 B2 | 7/2012 | Besser et al. |
| 8,266,360 B2 * | 9/2012 | Agrawal ............ G06F 13/423 710/305 |

(56) References Cited

U.S. PATENT DOCUMENTS

| | | |
|---|---|---|
| 8,281,386 B2 | 10/2012 | Milligan et al. |
| 8,287,306 B2 | 10/2012 | Daugherty et al. |
| 8,295,770 B2 | 10/2012 | Seil et al. |
| 8,310,380 B2 | 11/2012 | Aria et al. |
| 8,380,905 B2 | 2/2013 | Djabbari et al. |
| 8,390,441 B2 | 3/2013 | Covaro et al. |
| 8,465,762 B2 | 6/2013 | Lee et al. |
| 8,480,438 B2 | 7/2013 | Mattson |
| 8,560,147 B2 | 10/2013 | Taylor et al. |
| 8,587,318 B2 | 11/2013 | Chandler et al. |
| 8,651,874 B2 | 2/2014 | Ku et al. |
| 8,677,145 B2 | 3/2014 | Maletsky et al. |
| 8,694,770 B1 | 4/2014 | Osburn, III |
| 8,777,671 B2 | 7/2014 | Huang |
| 8,862,802 B2 | 10/2014 | Calvin et al. |
| 8,868,813 B2 | 10/2014 | Calvin et al. |
| 8,971,072 B2 | 3/2015 | Calvin et al. |
| 9,071,082 B2 | 6/2015 | Nishibayashi et al. |
| 9,318,917 B2 | 4/2016 | Kubota et al. |
| 9,436,641 B2 | 9/2016 | Calvin et al. |
| 9,465,762 B2 | 10/2016 | Calvin et al. |
| 9,467,297 B2 | 10/2016 | Clish et al. |
| 9,812,803 B2 | 11/2017 | Toyoda et al. |
| 10,103,875 B1 | 10/2018 | Roth et al. |
| 2002/0070835 A1 | 6/2002 | Dadafshar |
| 2002/0080828 A1 | 6/2002 | Ofek et al. |
| 2002/0080829 A1 | 6/2002 | Ofek et al. |
| 2002/0084698 A1 | 7/2002 | Kelly et al. |
| 2002/0086678 A1 | 7/2002 | Salokannel et al. |
| 2002/0095573 A1 | 7/2002 | O'Brien |
| 2002/0097031 A1 | 7/2002 | Cook et al. |
| 2002/0116619 A1 | 8/2002 | Maruyama et al. |
| 2002/0171525 A1 | 11/2002 | Kobayashi et al. |
| 2002/0182898 A1 | 12/2002 | Takahashi et al. |
| 2002/0189910 A1 | 12/2002 | Yano et al. |
| 2003/0005289 A1 | 1/2003 | Gougeon et al. |
| 2003/0040897 A1 | 2/2003 | Murphy et al. |
| 2003/0074489 A1 | 4/2003 | Steger et al. |
| 2003/0094855 A1 | 5/2003 | Lohr et al. |
| 2003/0105601 A1 | 6/2003 | Kobayashi et al. |
| 2003/0137277 A1 | 7/2003 | Mori et al. |
| 2003/0166397 A1 | 9/2003 | Aura |
| 2003/0202330 A1 | 10/2003 | Lopata et al. |
| 2003/0204756 A1 | 10/2003 | Ransom et al. |
| 2005/0001589 A1 | 1/2005 | Edington et al. |
| 2005/0019143 A1 | 1/2005 | Bishman |
| 2005/0091432 A1 | 4/2005 | Adams et al. |
| 2005/0102535 A1 | 5/2005 | Patrick et al. |
| 2005/0144437 A1 | 6/2005 | Ransom et al. |
| 2005/0144440 A1 | 6/2005 | Catherman et al. |
| 2005/0162019 A1 | 7/2005 | Masciarelli et al. |
| 2005/0182876 A1 | 8/2005 | Kim et al. |
| 2005/0189910 A1 | 9/2005 | Hui |
| 2005/0229004 A1 | 10/2005 | Callaghan |
| 2006/0015590 A1 | 1/2006 | Patil et al. |
| 2006/0020782 A1 | 1/2006 | Kakii |
| 2006/0108972 A1 | 5/2006 | Araya |
| 2006/0119315 A1 | 6/2006 | Sasaki et al. |
| 2006/0155990 A1 | 7/2006 | Katsube et al. |
| 2006/0156415 A1 | 7/2006 | Rubinstein et al. |
| 2007/0072442 A1 | 3/2007 | DiFonzo et al. |
| 2007/0076768 A1 | 4/2007 | Chiesa et al. |
| 2007/0123304 A1 | 5/2007 | Pattenden et al. |
| 2007/0123316 A1 | 5/2007 | Little |
| 2007/0143838 A1 | 6/2007 | Milligan et al. |
| 2007/0174524 A1* | 7/2007 | Kato ............ G06F 13/385 710/71 |
| 2007/0177298 A1 | 8/2007 | Jaatinen et al. |
| 2007/0194944 A1 | 8/2007 | Galera et al. |
| 2007/0214296 A1 | 9/2007 | Takamatsu et al. |
| 2007/0229302 A1 | 10/2007 | Penick et al. |
| 2007/0260897 A1* | 11/2007 | Cochran ............ G06F 1/263 713/300 |
| 2008/0067874 A1 | 3/2008 | Tseng |
| 2008/0077976 A1 | 3/2008 | Schulz |
| 2008/0123669 A1 | 5/2008 | Oliveti et al. |
| 2008/0140888 A1 | 6/2008 | Blair et al. |
| 2008/0181316 A1 | 7/2008 | Crawley et al. |
| 2008/0189441 A1 | 8/2008 | Jundt et al. |
| 2008/0194124 A1 | 8/2008 | Di Stefano |
| 2008/0303351 A1 | 12/2008 | Jansen et al. |
| 2009/0036164 A1 | 2/2009 | Rowley |
| 2009/0061678 A1 | 3/2009 | Minoo et al. |
| 2009/0066291 A1 | 3/2009 | Tien et al. |
| 2009/0083843 A1 | 3/2009 | Wilkinson, Jr. et al. |
| 2009/0091513 A1 | 4/2009 | Kuhn |
| 2009/0092248 A1 | 4/2009 | Rawson |
| 2009/0121704 A1 | 5/2009 | Shibahara |
| 2009/0204458 A1 | 8/2009 | Wiese et al. |
| 2009/0217043 A1 | 8/2009 | Metke et al. |
| 2009/0222885 A1 | 9/2009 | Batke et al. |
| 2009/0234998 A1 | 9/2009 | Kuo |
| 2009/0239468 A1 | 9/2009 | He et al. |
| 2009/0245245 A1 | 10/2009 | Malwankar et al. |
| 2009/0254655 A1 | 10/2009 | Kidwell et al. |
| 2009/0256717 A1 | 10/2009 | Iwai |
| 2009/0278509 A1 | 11/2009 | Boyles et al. |
| 2009/0287321 A1 | 11/2009 | Lucas et al. |
| 2009/0288732 A1 | 11/2009 | Gielen |
| 2010/0052428 A1 | 3/2010 | Imamura et al. |
| 2010/0066340 A1 | 3/2010 | Delforge |
| 2010/0082869 A1 | 4/2010 | Lloyd et al. |
| 2010/0122081 A1 | 5/2010 | Sato et al. |
| 2010/0148721 A1 | 6/2010 | Little |
| 2010/0149997 A1 | 6/2010 | Law et al. |
| 2010/0151816 A1 | 6/2010 | Besehanic et al. |
| 2010/0153751 A1 | 6/2010 | Tseng et al. |
| 2010/0197366 A1 | 8/2010 | Pattenden et al. |
| 2010/0197367 A1 | 8/2010 | Pattenden et al. |
| 2010/0233889 A1 | 9/2010 | Kiani et al. |
| 2010/0262312 A1 | 10/2010 | Kubota et al. |
| 2011/0010016 A1 | 1/2011 | Giroti |
| 2011/0066309 A1 | 3/2011 | Matsuoka et al. |
| 2011/0074349 A1 | 3/2011 | Ghovanloo |
| 2011/0080056 A1 | 4/2011 | Low |
| 2011/0082621 A1 | 4/2011 | Berkobin et al. |
| 2011/0089900 A1 | 4/2011 | Hogari |
| 2011/0140538 A1 | 6/2011 | Jung et al. |
| 2011/0150431 A1 | 6/2011 | Klappert |
| 2011/0185196 A1 | 7/2011 | Asano et al. |
| 2011/0196997 A1 | 8/2011 | Ruberg et al. |
| 2011/0197009 A1 | 8/2011 | Agrawal |
| 2011/0202992 A1 | 8/2011 | Xiao et al. |
| 2011/0285847 A1 | 11/2011 | Riedel et al. |
| 2011/0291491 A1 | 12/2011 | Lemmens et al. |
| 2011/0296066 A1 | 12/2011 | Xia |
| 2011/0313547 A1 | 12/2011 | Hernandez et al. |
| 2012/0028498 A1 | 2/2012 | Na et al. |
| 2012/0046015 A1 | 2/2012 | Little |
| 2012/0053742 A1 | 3/2012 | Tsuda |
| 2012/0102334 A1 | 4/2012 | O'Loughlin et al. |
| 2012/0124373 A1 | 5/2012 | Dangoor et al. |
| 2012/0143586 A1 | 6/2012 | Vetter et al. |
| 2012/0159210 A1 | 6/2012 | Hosaka |
| 2012/0236769 A1 | 9/2012 | Powell et al. |
| 2012/0242459 A1 | 9/2012 | Lambert |
| 2012/0265361 A1 | 10/2012 | Billingsley et al. |
| 2012/0271576 A1 | 10/2012 | Kamel et al. |
| 2012/0274273 A1 | 11/2012 | Jacobs et al. |
| 2012/0282805 A1 | 11/2012 | Ku et al. |
| 2012/0284354 A1 | 11/2012 | Mukundan et al. |
| 2012/0284514 A1 | 11/2012 | Lambert |
| 2012/0295451 A1 | 11/2012 | Hyun-Jun et al. |
| 2012/0297101 A1 | 11/2012 | Neupartl et al. |
| 2012/0311071 A1 | 12/2012 | Karaffa et al. |
| 2012/0322513 A1 | 12/2012 | Pattenden et al. |
| 2012/0328094 A1 | 12/2012 | Pattenden et al. |
| 2013/0011719 A1 | 1/2013 | Yasui et al. |
| 2013/0026973 A1 | 1/2013 | Luke et al. |
| 2013/0031382 A1 | 1/2013 | Jau et al. |
| 2013/0070788 A1 | 3/2013 | Deiretsbacher et al. |
| 2013/0170258 A1 | 7/2013 | Calvin et al. |
| 2013/0173832 A1 | 7/2013 | Calvin et al. |
| 2013/0211547 A1 | 8/2013 | Buchdunger et al. |

(56) References Cited

U.S. PATENT DOCUMENTS

| | | |
|---|---|---|
| 2013/0212390 A1 | 8/2013 | Du et al. |
| 2013/0224048 A1 | 8/2013 | Gillingwater et al. |
| 2013/0233924 A1 | 9/2013 | Burns |
| 2013/0244062 A1 | 9/2013 | Teramoto et al. |
| 2013/0290706 A1 | 10/2013 | Socky et al. |
| 2013/0291085 A1 | 10/2013 | Chong et al. |
| 2014/0015488 A1 | 1/2014 | Despesse |
| 2014/0068712 A1 | 3/2014 | Frenkel et al. |
| 2014/0075186 A1 | 3/2014 | Austen |
| 2014/0091623 A1 | 4/2014 | Shippy et al. |
| 2014/0095867 A1 | 4/2014 | Smith et al. |
| 2014/0097672 A1 | 4/2014 | Takemura et al. |
| 2014/0129162 A1 | 5/2014 | Hallman et al. |
| 2014/0131450 A1 | 5/2014 | Gordon et al. |
| 2014/0142725 A1 | 5/2014 | Boyd |
| 2014/0280520 A1 | 9/2014 | Baier et al. |
| 2014/0285318 A1 | 9/2014 | Audeon et al. |
| 2014/0312913 A1 | 10/2014 | Kikuchi et al. |
| 2014/0327318 A1 | 11/2014 | Calvin |
| 2014/0335703 A1 | 11/2014 | Calvin et al. |
| 2014/0341220 A1 | 11/2014 | Lessmann |
| 2015/0046701 A1 | 2/2015 | Rooyakkers et al. |
| 2015/0048684 A1 | 2/2015 | Rooyakkers et al. |
| 2015/0115711 A1 | 4/2015 | Kouroussis et al. |
| 2015/0365240 A1 | 12/2015 | Callaghan |
| 2016/0065656 A1 | 3/2016 | Patin et al. |
| 2016/0069174 A1 | 3/2016 | Cannan et al. |
| 2016/0172635 A1 | 6/2016 | Stimm et al. |
| 2016/0224048 A1 | 8/2016 | Rooyakkers et al. |
| 2016/0301695 A1 | 10/2016 | Trivelpiece et al. |
| 2018/0190427 A1 | 7/2018 | Rooyakkers et al. |

FOREIGN PATENT DOCUMENTS

| | | | |
|---|---|---|---|
| CN | 1440254 | A | 9/2003 |
| CN | 1571335 | A | 1/2005 |
| CN | 1702582 | A | 11/2005 |
| CN | 1839581 | A | 9/2006 |
| CN | 101005359 | A | 7/2007 |
| CN | 101069407 | A | 11/2007 |
| CN | 101262401 | A | 9/2008 |
| CN | 101322089 | A | 12/2008 |
| CN | 101447861 | A | 6/2009 |
| CN | 10153380 | A | 9/2009 |
| CN | 101576041 | A | 11/2009 |
| CN | 201515041 | U | 6/2010 |
| CN | 101809557 | A | 8/2010 |
| CN | 101919139 | A | 12/2010 |
| CN | 101977104 | A | 2/2011 |
| CN | 102035220 | A | 4/2011 |
| CN | 102237680 | A | 11/2011 |
| CN | 202205977 | U | 4/2012 |
| CN | 102480352 | A | 5/2012 |
| CN | 1934766 | B | 6/2012 |
| CN | 102546707 | A | 7/2012 |
| CN | 102809950 | A | 12/2012 |
| CN | 102812578 | A | 12/2012 |
| CN | 103376766 | A | 10/2013 |
| CN | 103682883 | A | 3/2014 |
| CN | 103701919 | A | 4/2014 |
| CN | 104025387 | A | 9/2014 |
| CN | 203932181 | U | 11/2014 |
| CN | 104185969 | A | 12/2014 |
| CN | 204243110 | U | 4/2015 |
| CN | 105556762 | A | 5/2016 |
| DE | 102013213550 | A | 1/2015 |
| EP | 473336 | A2 | 4/1992 |
| EP | 507360 | A2 | 10/1992 |
| EP | 1176616 | A2 | 1/2002 |
| EP | 1241800 | A1 | 9/2002 |
| EP | 1246563 | A1 | 10/2002 |
| EP | 1571559 | A1 | 7/2005 |
| EP | 1877915 | A2 | 1/2008 |
| EP | 1885085 | A1 | 2/2008 |
| EP | 1885085 | B1 | 6/2008 |
| EP | 2179364 | A2 | 4/2010 |
| EP | 2317743 | A1 | 5/2011 |
| EP | 2450921 | A1 | 5/2012 |
| EP | 2557657 | A2 | 2/2013 |
| EP | 2557670 | A2 | 2/2013 |
| EP | 2613421 | A1 | 10/2013 |
| EP | 2777796 | A1 | 9/2014 |
| EP | 2806319 | A2 | 11/2014 |
| JP | S59-074413 | | 5/1984 |
| JP | S59-177226 | | 11/1984 |
| JP | H0163190 | U | 4/1989 |
| JP | 04245411 | A | 9/1992 |
| JP | H05346809 | A | 12/1993 |
| JP | 07105328 | A | 4/1995 |
| JP | 07-320963 | A | 8/1995 |
| JP | 08-037121 | | 2/1996 |
| JP | 08098274 | | 4/1996 |
| JP | 08241824 | A | 9/1996 |
| JP | 08322252 | A | 12/1996 |
| JP | 09182324 | A | 7/1997 |
| JP | 1189103 | A | 3/1999 |
| JP | 11235044 | | 8/1999 |
| JP | H11230504 | A | 8/1999 |
| JP | 11-098707 | A | 9/1999 |
| JP | 11-312013 | | 9/1999 |
| JP | 2000252143 | | 9/2000 |
| JP | 2001292176 | A | 10/2001 |
| JP | 2001307055 | A | 11/2001 |
| JP | 2002134071 | A | 5/2002 |
| JP | 2002280238 | A | 9/2002 |
| JP | 2002343655 | A | 11/2002 |
| JP | 2002359131 | A | 12/2002 |
| JP | 3370931 | B2 | 1/2003 |
| JP | 2003047912 | A | 2/2003 |
| JP | 2003068543 | A | 3/2003 |
| JP | 2003142327 | A | 5/2003 |
| JP | 2003152703 | A | 5/2003 |
| JP | 2003152708 | A | 5/2003 |
| JP | 2003216237 | A | 7/2003 |
| JP | 2004501540 | A | 1/2004 |
| JP | 2004303701 | A | 10/2004 |
| JP | 2005038411 | A | 2/2005 |
| JP | 2005513956 | A | 5/2005 |
| JP | 2005151720 | A | 6/2005 |
| JP | 2005250833 | A | 9/2005 |
| JP | 2005275777 | A | 10/2005 |
| JP | 2005531235 | A | 10/2005 |
| JP | 2005327231 | A | 11/2005 |
| JP | 2005332406 | A | 12/2005 |
| JP | 2006060779 | A | 3/2006 |
| JP | 2006180460 | A | 7/2006 |
| JP | 2006223950 | A | 8/2006 |
| JP | 2006238274 | A | 9/2006 |
| JP | 2007034711 | A | 2/2007 |
| JP | 2007096817 | A | 4/2007 |
| JP | 2007519150 | A | 7/2007 |
| JP | 2007238696 | A | 9/2007 |
| JP | 2007252081 | A | 9/2007 |
| JP | 2008215028 | A | 9/2008 |
| JP | 2008257707 | A | 10/2008 |
| JP | 2008538668 | A | 10/2008 |
| JP | 4245411 | B2 | 3/2009 |
| JP | 2009157913 | A | 7/2009 |
| JP | 2009163909 | A | 7/2009 |
| JP | 2010503134 | A | 1/2010 |
| JP | 4439340 | B2 | 3/2010 |
| JP | 2010515407 | A | 5/2010 |
| JP | 2010135903 | A | 6/2010 |
| JP | 2011078249 | A | 4/2011 |
| JP | 2011217037 | A | 10/2011 |
| JP | 2011223544 | A | 11/2011 |
| JP | 5013019 | B1 | 8/2012 |
| JP | 2012190583 | A | 10/2012 |
| JP | 2012195259 | A | 10/2012 |
| JP | 2013021798 | A | 1/2013 |
| JP | 2013170258 | A | 9/2013 |
| JP | 2014507721 | A | 3/2014 |
| JP | 2014080952 | A | 5/2014 |
| JP | 2015023375 | A | 2/2015 |

(56) References Cited

FOREIGN PATENT DOCUMENTS

| | | |
|---|---|---|
| JP | 2016512039 A | 4/2016 |
| JP | 6189479 B1 | 8/2017 |
| KR | 10-20020088540 | 11/2002 |
| KR | 20050014790 A | 2/2005 |
| KR | 20060034244 A | 4/2006 |
| KR | 100705380 | 4/2007 |
| KR | 100807377 B1 | 2/2008 |
| TW | 201310344 A1 | 3/2013 |
| WO | 2005070733 A1 | 8/2005 |
| WO | 2006059195 A1 | 6/2006 |
| WO | 2007041866 A1 | 4/2007 |
| WO | 2007148462 A1 | 12/2007 |
| WO | 2008083387 A2 | 7/2008 |
| WO | 2009032797 A2 | 3/2009 |
| WO | 2011104935 A1 | 9/2011 |
| WO | 2013033247 A1 | 3/2013 |
| WO | 2013102069 A1 | 7/2013 |
| WO | 2014179556 A1 | 11/2014 |
| WO | 2014179566 A1 | 11/2014 |
| WO | 2015020633 A1 | 2/2015 |

OTHER PUBLICATIONS

Office Action for Japanese Application No. 2014-159475, dated Jul. 18, 2018.
Office Action for Japanese Application No. 2014-159475, dated Feb. 15, 2019.
Office Action for Japanese Application No. 2016-512039, dated Jun. 5, 2018.
Office Action for Japanese Application No. 2016-512039, dated Feb. 5, 2019.
International Search Report and Written Opinion for PCT/US2014/036368, dated Sep. 12, 2014.
Office Action for Chinese Appln No. 201380079515.9, dated Nov. 16, 2017.
Office Action for Chinese Appln No. 2013800795 dated Aug. 7, 2018.
Office Action for Chinese Appln No. 201380079515.9, dated Feb. 25, 2019.
Supplementary Search Report in European Application No. 13890953.6, dated Jan. 26, 2017.
Office Action for Japanese Application No. 2016-533280, dated Jun. 28, 2017.
Office Action for Japanese Application No. 2016-533280, dated Apr. 11, 2018.
Office Action for Japanese Application No. 2016-533280, dated Jan. 7, 2019.
International Search Report and Written Opinion for PCT/US2013/053721, dated May 12, 2014.
Office Action for Chinese Appln No. 201380079514.4, dated Feb. 5, 2018.
Office Action for Chinese Appln No. 201380079514.4, dated Nov. 5, 2018.
Examination Report for European Application No. 13891327.2, dated Sep. 26, 2018.
Supplementary Search Report for European Application No. 13891327.2, dated Jan. 10, 2017.
Reason for Rejection in Japanese Patent Application No. 2016-533279, dated Aug. 13, 2018.
Notice of Reasons for Rejection in Japanese Patent Application No. 2016-533279, dated Jul. 13, 2017.
Notice of Reason for Rejection in Japanese Patent Application No. 2016-533279, dated Mar. 1, 2018.
Fabien Fleuot, "Raspberry Pi + Mihini, Controlling an off-the-grid Electrical Installation, Part I," Apr. 11, 2014, XP055290314.
Generex Systems Gmbh, "BACS—Battery Analysis & Care System," Aug. 17, 2014, XP055290320.
Siemens, "Uninterruptible 24 V DC Power Supply High-Performance, communicative and integrated in TIA," Mar. 31, 2015, XP055290324.

"Introduction to Cryptography," Network Associates, Inc., PGP 6.5.1, 1990-1999, Retrieved @ (ftp://ftp.pgpi.org/pub/pgp/6.5/docs/english/IntroToCrypto.pdf) on Mar. 17, 2016, (refer to pp. 16-20).
Stouffer, et al. "Guide to Industrial Control Systems (ICS) Security," NIST, Special Pub. 800-82, Jun. 2011, (refer to pp. 2-1 to 2-10).
Rodrigues, A. et al., "Scada Security Device," Proceedings of the Seventh Annual Workshop on Cyber Security and Information Intelligence Research, CSIIRW '11, Jan. 1, 2011, XP055230335.
Zafirovic-Vukotic, M. et al., "Secure SCADA network supporting NERC CIP", Power & Energy Society General Meeting, 2009, PES '09, IEEE, Piscataway, NJ, USA, Jul. 26, 2009, pp. 1-8, XP031538542.
Roman Kieinerman; Daniel Feldman (May2011), Power over Ethernet (PoE): An Energy-Efficient Alternative (PDF), Marvell, retrieved Aug. 25, 2018 @ http://www.marvell.com/switching/assets/Marvell-PoE-An-Energy-Efficient-Alternative. pdf (Year: 2011).
Molva, R. Ed et al., "Internet security architecture", Computer Networks, Elsevier Science Publishers B. V., Amsterdam, NL, vol. 31, No. 8, Apr. 23, 1999, pp. 787-804, XP004304518.
Rodrigues, A., "SCADA Security Device: Design and Implementation", Master of Science Thesis, Wichita State University, Dec. 2011.
CGI, White Paper on "Public Key Encryption and Digital Signature: How do they work?", 2004 (refer to pp. 3-4).
Baran, M.E. et al., "Overcurrent Protection on Voltage-Source-Converter-Based Multiterminal DC Distribution Systems," IEEE Transactions on Power Delivery, Jan. 2007.
Office Action for Canadian Application No. 2,875,517, dated May 4, 2015.
Office Action for Chinese Application No. 201410802889.5, dated Jul. 26, 2018.
Search Report for European Application No. 14196406.4, dated Nov. 4, 2015.
European Search Report for European Application No. 14196406.4, dated Sep. 23, 2015.
Extended Search Report for European Application No. 16165112.0, dated Sep. 6, 2016.
Examination Report for European Application No. 16165112.0, dated Feb. 16, 2018.
Notice of Reason for Rejection for Japanese Application No. 2014-243827, dated Jan. 24, 2019.
Office Action for Chinese Application No. 2015103905202.2, dated Jun. 20, 2018.
Office Action for Chinese Application No. 2015103905202.2, dated Mar. 6, 2019.
Search Report for European Application No. 15175744.0, dated Apr. 26, 2016.
Partial Search Report for European Application No. 15175744.0, dated Dec. 14, 2015.
Office Action for Canadian Application No. 2,875,518, dated Jun. 3, 2015.
Office Action for Canadian Application No. 2,875,518, dated Apr. 22, 2016.
European Search Report for EP Application No. 14196408.0, dated Nov. 24, 2015.
Office Action for Canadian Application No. 2,875,515, dated Jul. 5, 2017.
Office Action for Canadian Application No. 2,875,515, dated Feb. 10, 2017.
Office Action for Canadian Application No. 2,875,515, dated Jun. 1, 2016.
Office Action for Canadian Application No. 2,875,515, dated Oct. 6, 2016.
Office Action for Chinese Application No. 201410799473.2, dated Oct. 12, 2018.
Examination Report for European Application No. 14196409.8, dated Jan. 22, 2018.
Search Report for European Application No. 14196409.8, dated May 19, 2016.
Notice of Reason for Rejection for Japanese Application No. 2014-243830, dated Sep. 21, 2018.
Office Action for Canadian Application No. 2,920,133, dated Jan. 30, 2017.

(56) References Cited

OTHER PUBLICATIONS

Office Action for Canadian Application No. 2,920,133, dated Oct. 19, 2016.
Search Report for European Application No. 16154943.1, dated Jun. 17, 2016.
Partial European Search Report in European Application No. 17208183.8, dated Mar. 28, 2018.
Examination Report in European Application No. 17208183.8, dated Jun. 22, 2018.
Examination Report in European Application No. 17208183.8, dated Feb. 27, 2019.
Office Action for Chinese Appln. No. 201610239130.X, dated Feb. 14, 2018.
Office Action for Chinese Appln. No. 201610239130.X, dated Aug. 2, 2017.
Office Action for Chinese Application No. 201280065564.2, dated Aug. 3, 2016.
Office Action for Chinese Application No. 201280065564.2, dated Feb. 28, 2017.
Office Action for Chinese Application No. 201280065564.2, dated Oct. 19, 2017.
Partial Supplementary European Search Report in Application No. 12862174.5, dated Nov. 3, 2015.
European Search Report in Application No. 12862174.5, dated Feb. 15, 2016.
European Search Report in Application No. 17178867.2, dated Nov. 2, 2017.
Office Action for Japanese Application No. 2014-550508, dated Dec. 2, 2016.
Office Action for Japanese Application No. 2014-550508, dated Sep. 15, 2017.
Office Action for CN Appln. No. 201410182071.8, dated Mar. 1, 2017.
Office Action for Chinese Application No. 201410383686.7, dated May 31, 2017.
Office Action for Chinese Application No. 201410383686.7, dated Feb. 23, 2018.
Office Action for Chinese Application No. 201480034066.0, dated May 3, 2017.
Search Report and Opinion for European Application No. 14166908.8, dated Jan. 7, 2015.
Extended Search Report for European Application No. 14180106.8, dated Jul. 13, 2015.
Examination Report for European Application No. 14180106.8, dated Jun. 28, 2017.
Supplementary Search Report for European Application No. 14791210.9, dated Dec. 6, 2016.
Office Action for Japanese Application No. 2014-080952, dated May 2, 2018.
Office Action for apanese Application No. 2014-080952, dated Jan. 7, 2019.
Canadian Office Action for Application No. 2920133 dated Jan. 30, 2017.
Canadian Office Action for Application No. 2920133 dated Oct. 19, 2016.
European Search Report dated Dec. 2, 2015 for EP Application No. 14196408.0.
European search report for European Patent Application No. EP14196406 dated Oct. 2, 2015, 6 pages.
European Search Report published Nov. 4, 2015 in Application No. EP14196406.4.
Examination Report for European Application No. 17178867.2, dated Mar. 13, 2019.
Examination Report for European Application No. 16165112.0, dated Apr. 17, 2019.
Supplementary European Search Report for European Patent Application No. EP 14791210 dated Dec. 16, 2016, 11 pages.
Examination Report for European Patent Application No. 16154943.1, dated May 16, 2019.
Extended European Search Report for Application No. EP14180106.8, dated Aug. 12, 2015.
Extended European Search Report for European Patent Application No. EP 14196409 dated May 31, 2016, 10pages.
Extended European Search Report for European Patent Application No. EP 16154943 dated Jun. 29, 2016, 9pages.
Extended European Search Report for European Patent Application No. EP 18176358 dated Sep. 11, 2018, 11 pages.
International Search Report and Written Opinion dated May 12, 2014 in International Application# PCT/US2013/053721.
Notice of Reason for Rejection for Japanese Patent Application No. 2014-243830, dated Jul. 10, 2019.
Notice of Reason for Rejection for JP Patent Application No. 2018-109151, dated Jun. 25, 2019.
Office Action for Chinese Application No. 2015103905202.2, dated Aug. 6, 2019.
Siemens AG: "ERTEC 400 I Enhanced Real-Time Ethernet Controller I Handbuch", No. Version 1.2.2 pp. 1-98, XP002637652, Retrieved from the Internet: URL:http:llcache.automation.siemens.comldniiDUIDUxNDgzNwAA_21631481_HBIERTEC400_Handbuch_V122.pdf [retrieved on May 2, 2011].
Office Action for Canadian Application No. 2,875,515 dated Feb. 17, 2016.
Office Action for Chinese Patent Application 201410802889.5, dated May 7, 2019.
Office Action for Canadian Application No. 2,920,133, dated Apr. 14, 2016.
Office Action for Chinese Application No. 20141079995.2, dated Jul. 3, 2019.
Partial European Search Report for European Patent Application No. EP 15175744 dated Jan. 4, 2016, 7 pages.
Partial Supplementary European Search Report dated Nov. 10, 2015 in Application# EP12862174.5.
Supplementary European Search Report for European Patent Application No. EP 13890953 dated Feb. 6, 2017, 9 pages.
Office Action for Japanese Application No. 2015-136186, dated Oct. 10, 2019.
Office Action for Japanese Application No. 2014-159475, dated Jun. 11, 2018.
Decision of Rejection for Patent Application No. 2014-243827, dated Nov. 28, 2019.
Decision of Rejection for Chinese Application No. 2015103905202.2, dated Nov. 5, 2019.
Examination Report for European Patent Application No. 1720883.8, dated Oct. 29, 2019.
Notice of Reason for Rejection for Patent Application No. 2016-021763, dated Nov. 27, 2019.
Office Action for Chinese Patent Application No. 201610236358.3, dated Sep. 4, 2019.
Office Action forChinese Patent Application 201410802689.5, dated Dec. 4, 2019.
Office Action from Chinese Patent Application No. 201610229230.4, dated Oct. 24, 2019.
Office Action from EP Application No. 14196406.4, dated Jul. 29, 2019.
Notice of Reason for Rejection for Japanese Application No. 2016-080207, dated Jun. 4, 2020.
Decision of Rejection for Japanese Application No. 2014-243830, dated Mar. 18, 2020.
Reason for Rejection for Japanese Application No. 2015-136186, dated May 7, 2020.
Summons to attend oral proceedings for European Application No. 14196409.8, dated Nov. 13, 2019.
Office Action for Japanese Application No. 2016-533280, dated Jun. 29, 2020.
Office Action for Chinese Patent Application No. 201610236358.3; dated Jun. 24, 2020.
Office Action from Chinese Patent Application No. 201610229230.4, dated Jul. 15, 2020.

\* cited by examiner

```
┌─────────────────────────────────────────────────────────────────┐
│ 910  COUPLE INPUT/OUTPUT MODULES WITH A CONTROL MODULE          │
│  ┌───────────────────────────────────────────────────────────┐  │
│  │ 920  CONNECT THE INPUT/OUTPUT MODULES TO THE CONTROL      │  │
│  │ MODULE IN PARALLEL FOR TRANSMITTING INFORMATION BETWEEN   │  │
│  │ THE INPUT/OUTPUT MODULES AND THE CONTROL MODULE           │  │
│  │   ┌─────────────────────────────────────────────────┐     │  │
│  │   │ 922  CONNECT THE INPUT/OUTPUT MODULES TO THE    │     │  │
│  │   │ CONTROL MODULE USING A MULTIDROP BUS            │     │  │
│  │   └─────────────────────────────────────────────────┘     │  │
│  └───────────────────────────────────────────────────────────┘  │
│  ┌───────────────────────────────────────────────────────────┐  │
│  │ 930  SEPARATELY CONNECT THE INPUT/OUTPUT MODULES TO THE   │  │
│  │ CONTROL MODULE FOR TRANSMITTING INFORMATION BETWEEN THE   │  │
│  │ INPUT/OUTPUT MODULES AND THE CONTROL MODULE, AND FOR      │  │
│  │ TRANSMITTING INFORMATION BETWEEN INDIVIDUAL ONES OF THE   │  │
│  │ INPUT/OUTPUT MODULES                                      │  │
│  │   ┌─────────────────────────────────────────────────┐     │  │
│  │   │ 932  SEPARATELY CONNECT THE INPUT/OUTPUT        │     │  │
│  │   │ MODULES TO THE CONTROL MODULE USING A CROSS     │     │  │
│  │   │ SWITCH                                          │     │  │
│  │   └─────────────────────────────────────────────────┘     │  │
│  └───────────────────────────────────────────────────────────┘  │
└─────────────────────────────────────────────────────────────────┘
┌─────────────────────────────────────────────────────────────────┐
│ 940  COUPLE THE INPUT/OUTPUT MODULES WITH A REDUNDANT CONTROL   │
│ MODULE                                                          │
│   ┌─────────────────────────────────────────────────────────┐   │
│   │ 950  CONNECT THE INPUT/OUTPUT MODULES TO THE REDUNDANT  │   │
│   │ CONTROL MODULE IN PARALLEL                              │   │
│   └─────────────────────────────────────────────────────────┘   │
│   ┌─────────────────────────────────────────────────────────┐   │
│   │ 960  SEPARATELY CONNECT THE INPUT/OUTPUT DEVICES TO THE │   │
│   │ REDUNDANT CONTROL MODULE                                │   │
│   └─────────────────────────────────────────────────────────┘   │
└─────────────────────────────────────────────────────────────────┘
┌─────────────────────────────────────────────────────────────────┐
│ 970  COUPLE THE CONTROL MODULE WITH A NETWORK FOR TRANSMITTING  │
│ INFORMATION COLLECTED FROM THE INPUT/OUTPUT MODULES VIA THE     │
│ NETWORK                                                         │
└─────────────────────────────────────────────────────────────────┘
┌─────────────────────────────────────────────────────────────────┐
│ 980  COUPLE THE INPUT/OUTPUT MODULES WITH A POWER MODULE FOR    │
│ SUPPLYING ELECTRICAL POWER TO THE INPUT/OUTPUT MODULES          │
└─────────────────────────────────────────────────────────────────┘
```

FIG. 9

COMMUNICATIONS CONTROL SYSTEM WITH A SERIAL COMMUNICATIONS INTERFACE AND A PARALLEL COMMUNICATIONS INTERFACE

BACKGROUND

Industrial and process control systems include various types of control equipment used in industrial production, such as Supervisory Control and Data Acquisition (SCADA) systems, Distributed Control Systems (DCS), and other control equipment using, for example, Programmable Logic Controllers (PLC). These control systems are typically used in industries including electrical, water, oil, gas, and data. Using information collected from remote stations in the field, automated and/or operator-driven supervisory commands can be transmitted to field control devices. These field devices control local operations, such as opening and closing valves and breakers, collecting data from sensor systems, and monitoring a local environment for alarm conditions.

For example, SCADA systems typically use open-loop control with sites that may be widely separated geographically, using potentially unreliable or intermittent low-bandwidth/high-latency links. These systems use Remote Terminal Units (RTUs) to send supervisory data to a control center. The RTUs may have a limited capacity for local controls when the master station is not available. DCS systems are generally used for real time data collection and control with high-bandwidth, low-latency data networks. PLCs typically provide Boolean logic operations, timers, continuous control, and so on. However, as industrial control systems evolve, new technologies are combining aspects of these various types of control systems. For instance, Programmable Automation Controllers (PACs) can include aspects of SCADA, DCS, and PLCs.

SCADA systems can be used with industrial processes, including manufacturing, production, power generation, fabrication, and refining. They can also be used with infrastructure processes, including water treatment and distribution, wastewater collection and treatment, oil and gas pipelines, electrical power transmission and distribution, wind farms, large communication systems, and so forth. Further, SCADA systems can be used in facility processes for buildings, airports, ships, space stations, and the like (e.g., to monitor and control Heating, Ventilation, and Air Conditioning (HVAC) equipment and energy consumption). DCS systems are generally used in large campus industrial process plants, such as oil and gas, refining, chemical, pharmaceutical, food and beverage, water and wastewater, pulp and paper, utility power, mining, metals, and so forth. PLCs are typically used in industrial sectors and with critical infrastructures.

SUMMARY

A communications control system is disclosed. In one or more implementations, the communications control system includes a serial communications interface and a parallel communications interface for coupling a plurality of input/output modules with a control module. The serial communications interface is configured for connecting the plurality of input/output modules to the control module in parallel to transmit information between the plurality of input/output modules and the control module, and the parallel communications interface is configured for separately connecting the plurality of input/output modules to the control module to transmit information between the plurality of input/output modules and the control module, and to transmit information between individual ones of the plurality of input/output modules. The serial communications interface may comprise a multidrop bus, and the parallel communications interface may comprise a cross switch.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

FIG. 9 is a flow diagram illustrating a process for furnishing communication between multiple input/output modules and one or more communications/control modules in accordance with example implementations of the present disclosure.

DETAILED DESCRIPTION

Overview

Figure 1:
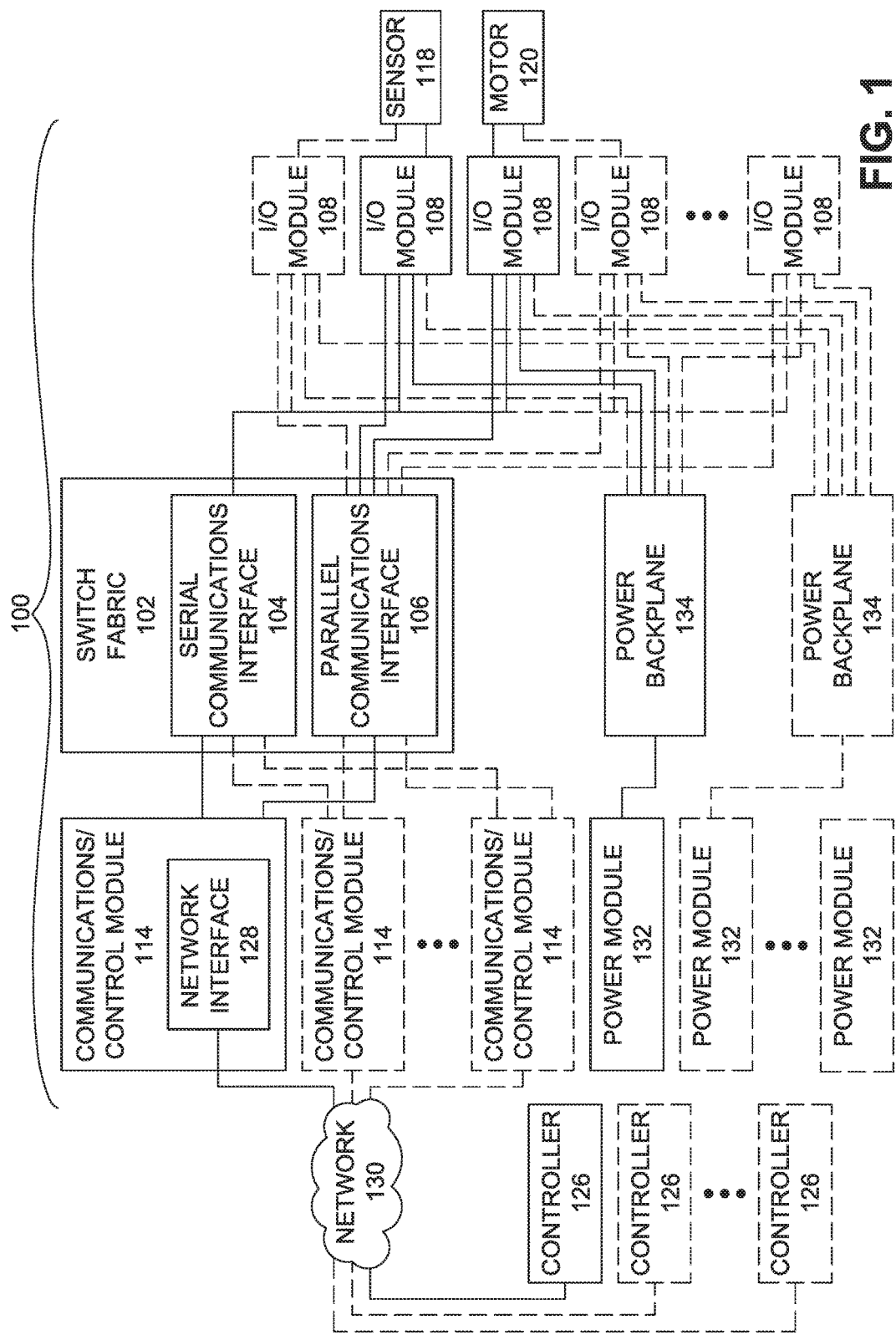
FIG. 1 is a block diagram illustrating a communications control system in accordance with example implementations of the present disclosure.

Process control systems typically use two types of busses: multidrop busses and parallel backplanes. A multidrop serial bus with a master and multiple slave devices may be used for distributed control systems where reliability is critical, such as safety-critical systems, and the like. However, as additional devices are connected to a multidrop serial bus, data transfer speeds between components within the system may slow considerably. A parallel backplane may be used where multiple devices are connected in parallel, such as with programmable logic controllers. Parallel backplanes offer increased data transfer speeds compared to multidrop serial busses. However, parallel backplanes do not offer redundancy for safety-critical systems.

Accordingly, communications control systems are described that include a switch fabric having a serial communications interface (e.g., a serial or Multidrop Bus (MDB) with a master and multiple slaves) and a parallel communications interface (e.g., a parallel or point-to-point bus implemented using a cross switch, or the like). The serial communications interface and the parallel communications interface may be used for connecting multiple Input/Output (I/O) modules to communications/control modules, and to one another.

In some implementations, the serial communications interface and the parallel communications interface may be formed on a single printed circuit board. The serial communications interface may be configured for connecting the plurality of input/output modules to a redundant control module in parallel, and the parallel communications interface may be configured for separately connecting the plurality of input/output modules to the redundant control module. Information transmitted via the serial communications interface and/or the parallel communications interface may be packetized. The control module may comprise a network interface for transmitting information collected from the plurality of input/output modules via a network, and so forth. Additionally, the communications control system may include a power module for supplying electrical power to at least one of the plurality of input/output modules.

A communications control system configured in accordance with the present disclosure may provide deterministic behavior (e.g., with respect to data turnaround time) and reliability for critical systems, while still providing speed and scalability. The communications control system may provide fault isolation, along with data turnaround times that do not increase as additional components are added to a system. Further, the communications control system may allow components connected to the system to communicate directly with one another using the communications control system. Communications control systems configured in this manner may be implemented in various systems that may otherwise use a parallel backplane.

Example Implementations

FIGS. 1 through 8 illustrate an example communications control system 100 in accordance with the present disclosure. In implementations, the communications control system 100 may be configured for use with process control systems technology, and so forth. For example, the communications control system 100 may be used with a distributed control system comprised of controller elements and subsystems, where the subsystems are controlled by one or more controllers distributed throughout the system. The communications control system 100 includes a switch fabric 102 comprising a serial communications interface 104 and a parallel communications interface 106 for furnishing communications with a number of I/O modules 108.

The serial communications interface 104 may be implemented using a group of connectors connected in parallel with one another. For example, the serial communications interface 104 may be implemented using a multidrop bus 110, or the like. In implementations, the multidrop bus 110 may be used for configuration and diagnostic functions of the I/O modules 108. The parallel communications interface 106 allows multiple signals to be transmitted simultaneously over multiple dedicated high speed parallel communication channels. For instance, the parallel communications interface 106 may be implemented using a cross switch 112, or the like.

Figure 2:
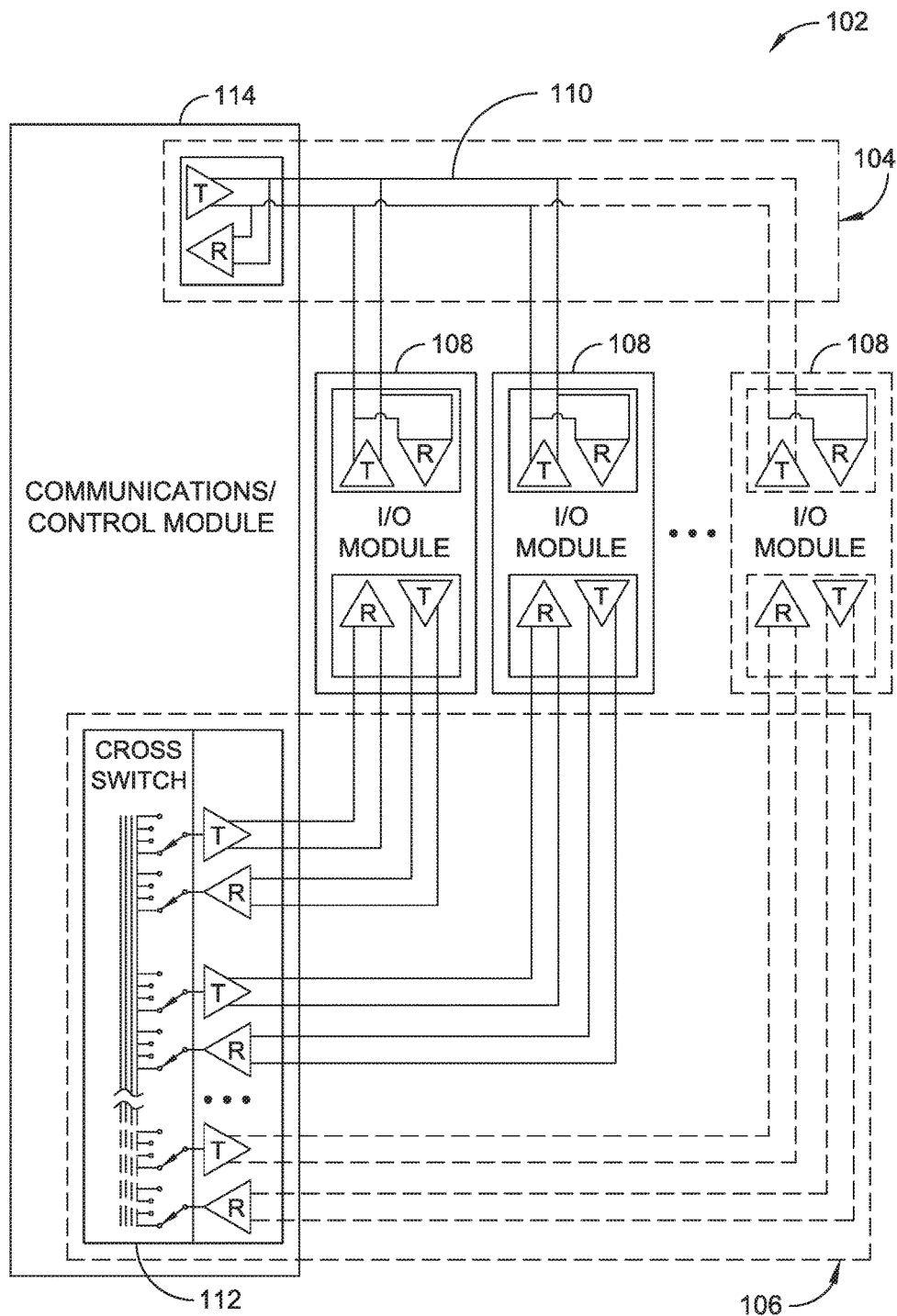
FIG. 2 is a circuit diagram illustrating a switch fabric for a communications control system in accordance with example implementations of the present disclosure.
Figure 3:
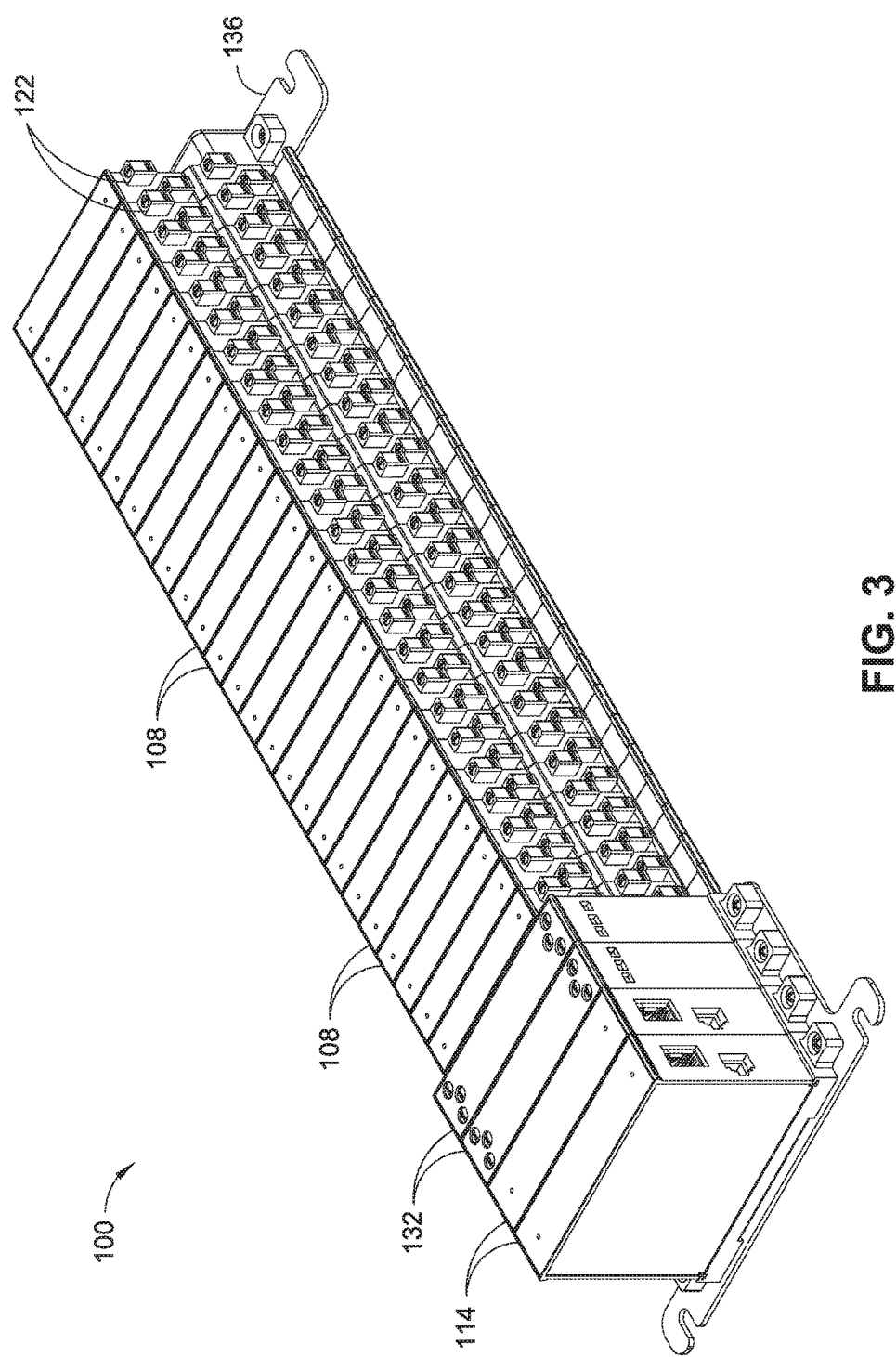
FIG. 3 is an isometric view illustrating a communications control system in accordance with example implementations of the present disclosure.
Figure 4:
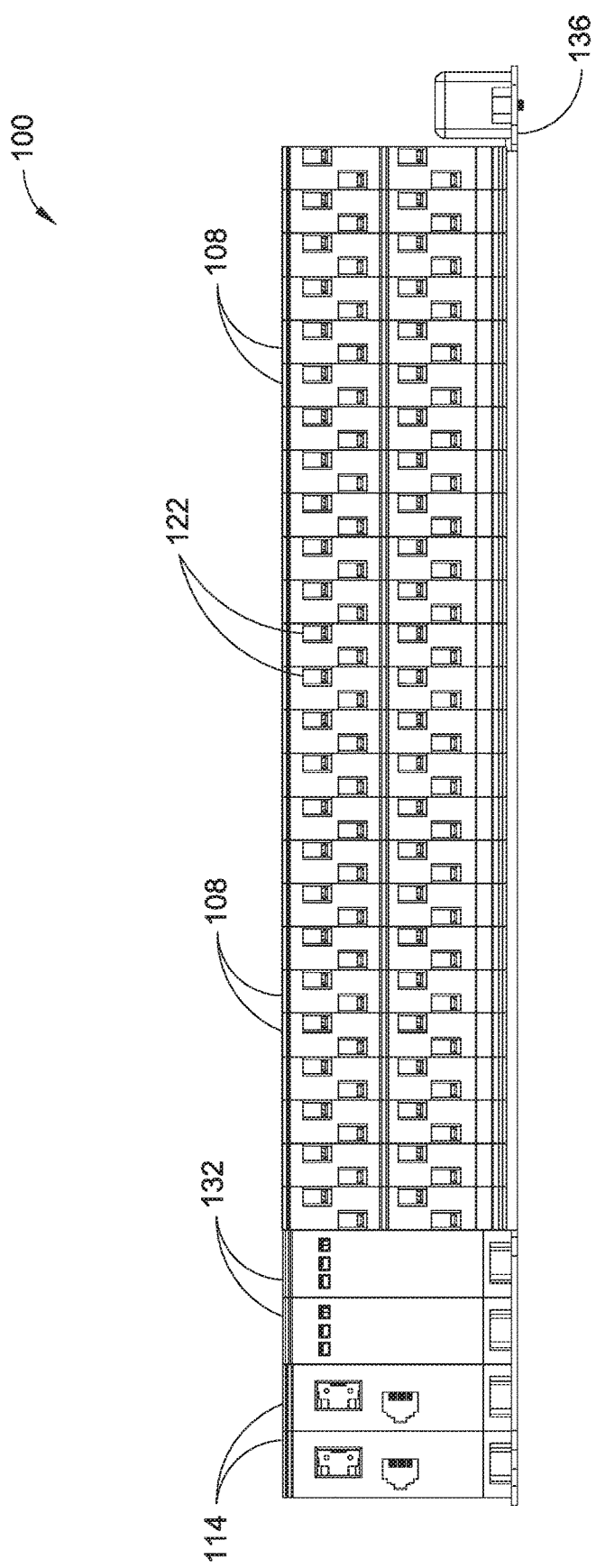
FIG. 4 is a side elevation view of the communications control system illustrated in FIG. 3.
Figure 5:
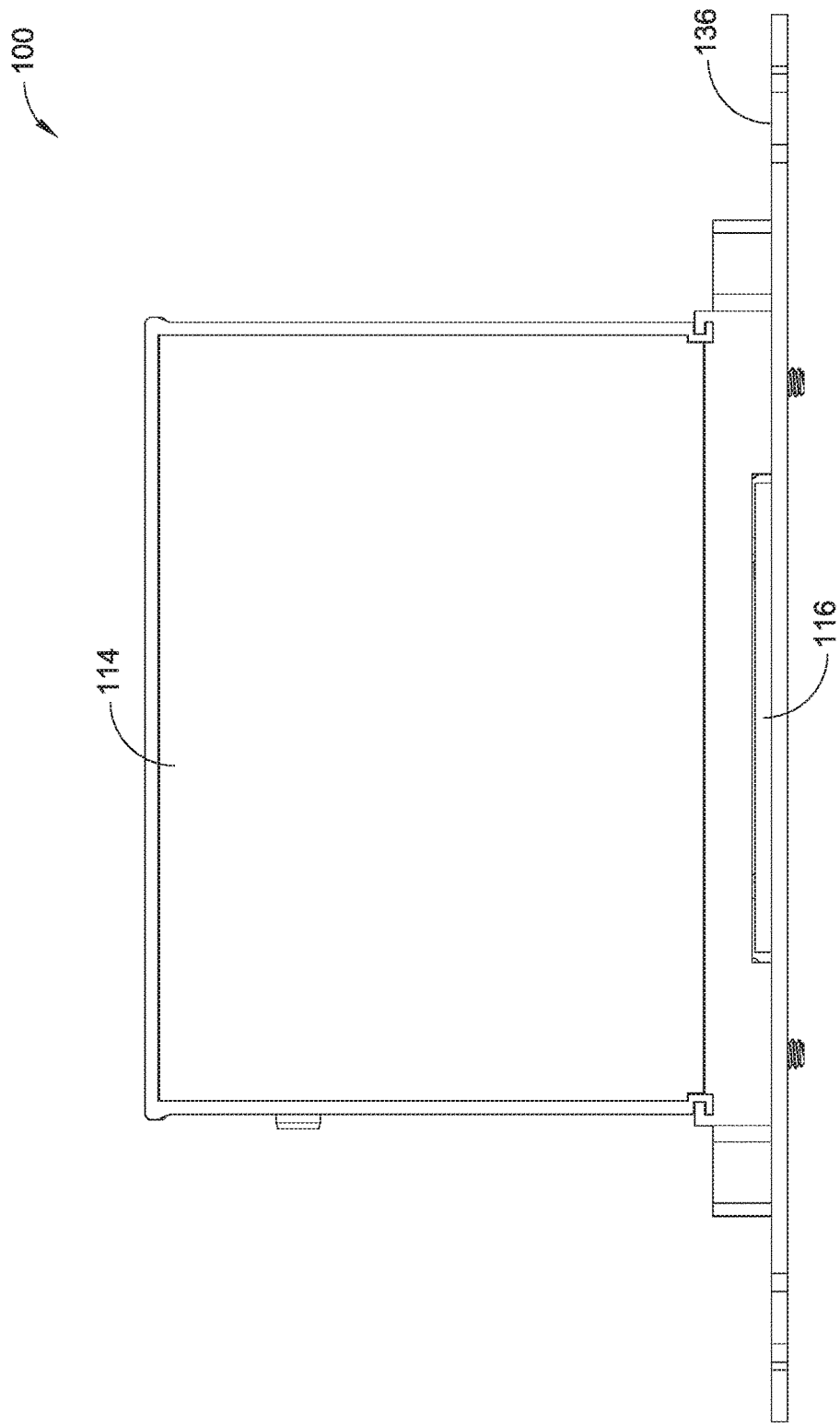
FIG. 5 is an end view of the communications control system illustrated in FIG. 3.
Figure 6:
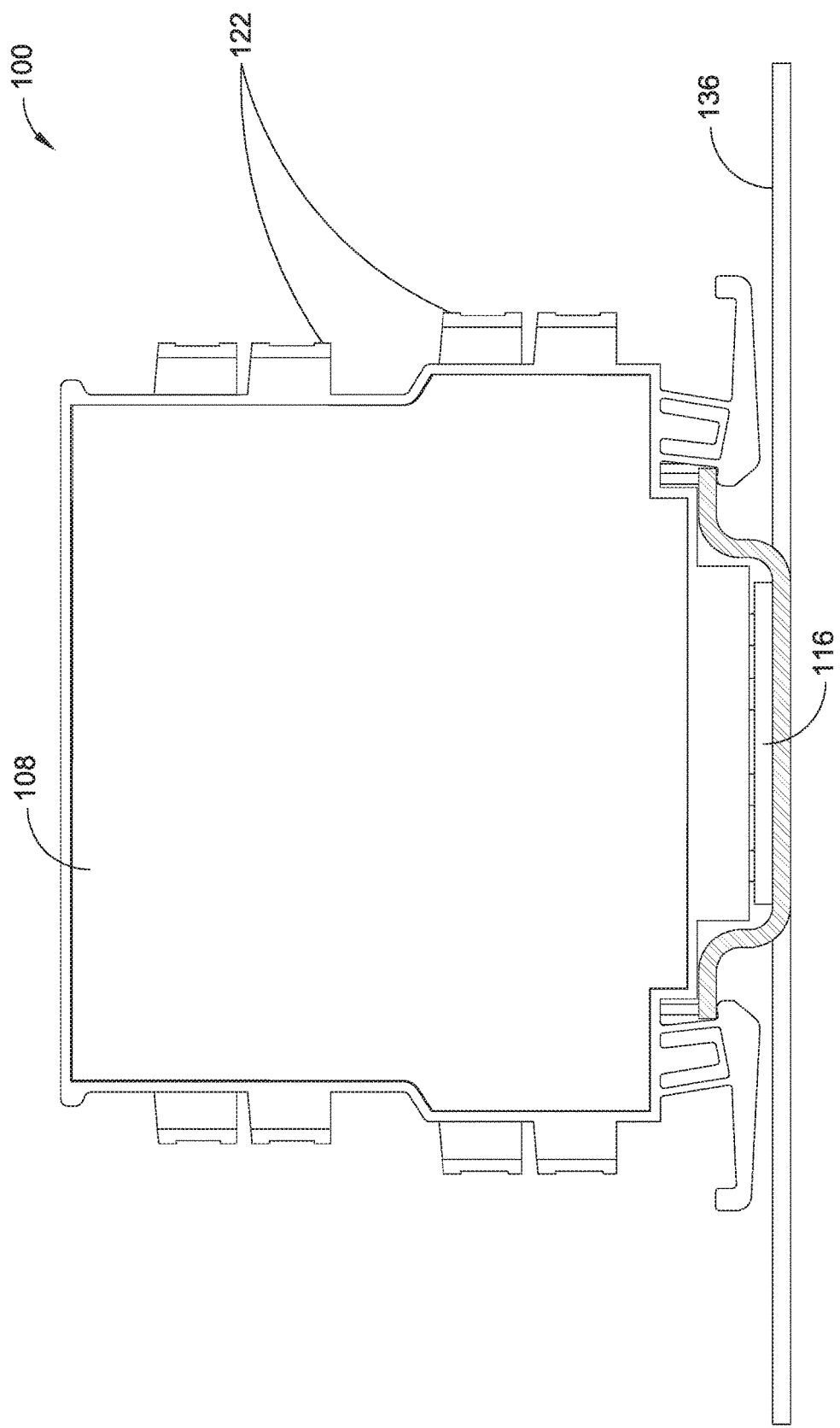
FIG. 6 is a partial cross-sectional end view of the communications control system illustrated in FIG. 3.
Figure 7:
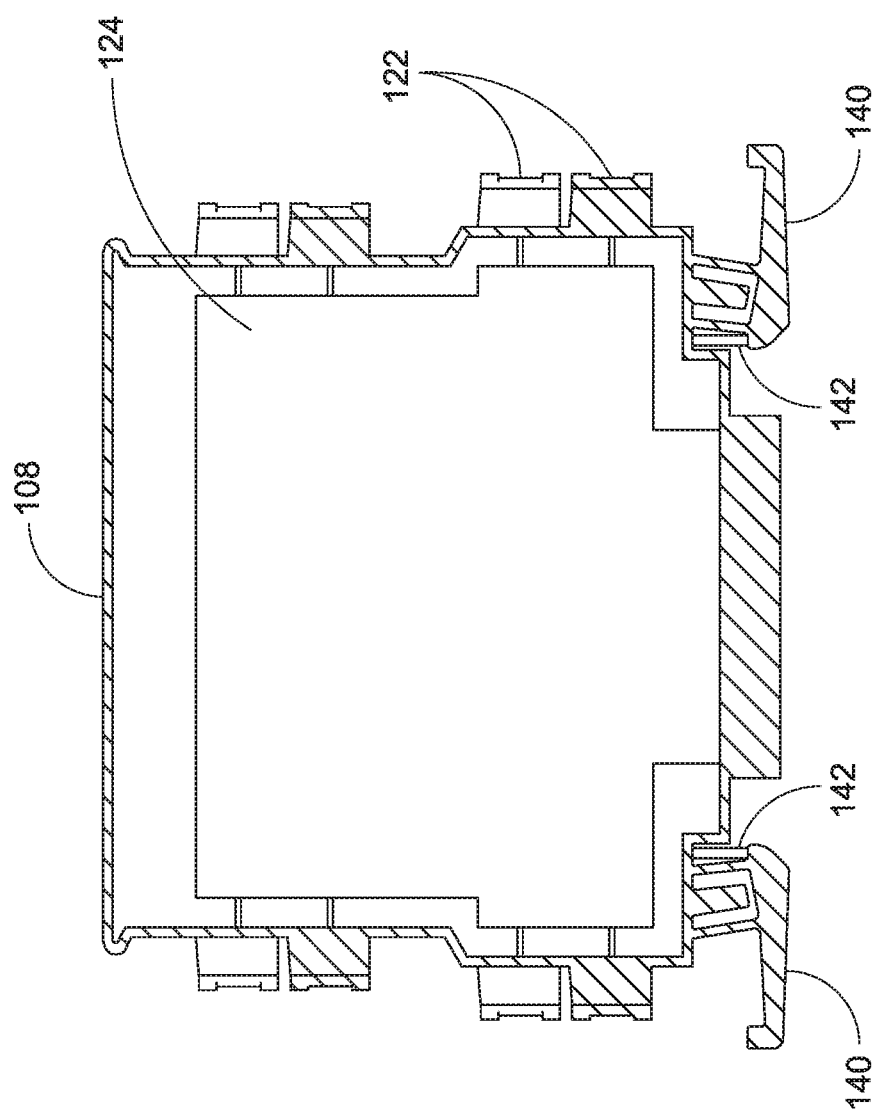
FIG. 7 is a cross-sectional view illustrating an input/output module for the communications control system illustrated in FIG. 3.
Figure 8:
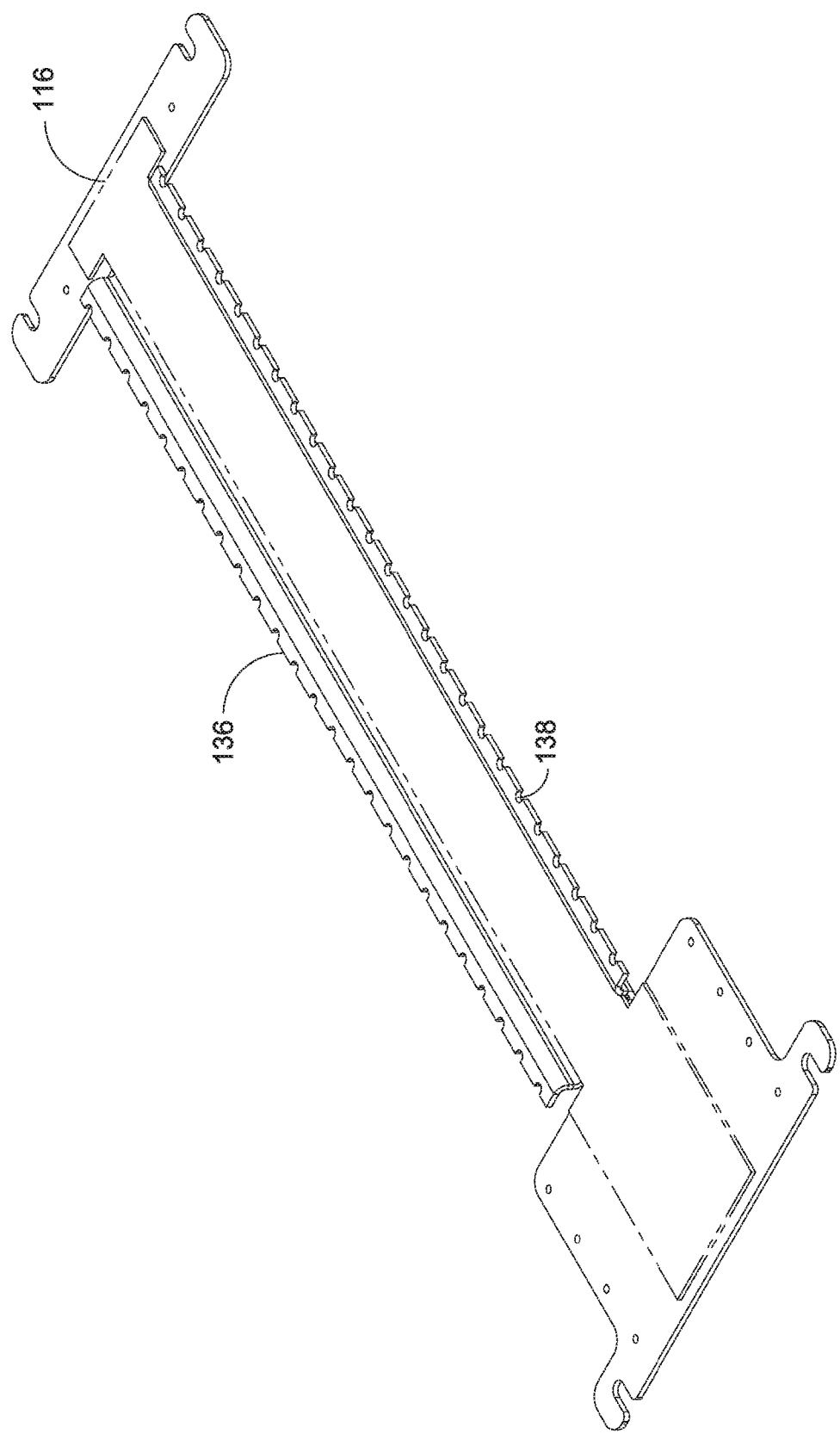
FIG. 8 is an isometric view illustrating a support frame for the communications control system illustrated in FIG. 3.

In a particular implementation, as described in FIG. 2, the parallel communications interface 106 can be implemented using a four (4) wire full duplex cross switch 112 with a dedicated connection to each I/O module 108. For example, the cross switch 112 can be implemented as a programmable cross switch connecting point-to-point busses and allowing traffic between the I/O modules 108. The cross switch 112 may be configured by a master device, such as a communications/control module 114. For example, a communications/control module 114 may configure one or more sets of registers included in the cross switch 112 to control traffic between the I/O modules 108. In implementations, a communications/control module 114 may comprise a rule set dictating how the I/O modules 106 are interconnected. For example, a communications/control module 114 may comprise a set of registers, where each register defines the operation of a particular switch (e.g., with respect to how packets are forwarded, and so forth). Thus, the cross switch 112 may not necessarily auto-configure, instead implementing a configuration provided by a communications/control module 114. However, this configuration is provided by way of example only and is not meant to be restrictive of the present disclosure. Thus, in other implementations, the cross switch 112 may auto-configure.

The parallel communications interface 106 may be used for data collection from the I/O modules 108. Further, because each I/O module 108 has its own private bus to the master (e.g., communications/control modules 114), each I/O module 108 can communicate with the master at the same time. Thus, the total response time for the communications control system 100 may be limited to that of the slowest I/O module 108, instead of the sum of all slave devices.

In implementations, the switch fabric 102, the serial communications interface 104, and the parallel communications interface 106 may be implemented in a single, monolithic circuit board 116. However, this configuration is provided by way of example only and is not meant to be restrictive of the present disclosure. Thus, the serial communications interface 104 and the parallel communications interface 106 may be implemented using different arrangements of multiple components, such as multiple discrete semiconductor devices for implementing the serial communications interface 104 and the parallel communications interface 106 separately, and so forth.

The switch fabric 102 may be configured for connecting one or more I/O modules 108 and transmitting data to and from the I/O modules 108. The I/O modules 108 may comprise input modules, output modules, and/or input and output modules. For instance, input modules can be used to receive information from input instruments in the process or the field, while output modules can be used to transmit instructions to output instruments in the field. For example, an I/O module 108 can be connected to a process sensor, such as a sensor 118 for measuring pressure in piping for a gas plant, a refinery, and so forth. In implementations, the I/O modules 116 may be used to collect data and control systems in applications including, but not necessarily limited to: industrial processes, such as manufacturing, production, power generation, fabrication, and refining; infrastructure processes, such as water treatment and distribution, wastewater collection and treatment, oil and gas pipelines, electrical power transmission and distribution, wind farms, and large communication systems; facility processes for buildings, airports, ships, and space stations (e.g., to monitor and control Heating, Ventilation, and Air Conditioning (HVAC) equipment and energy consumption); large campus industrial process plants, such as oil and gas, refining, chemical, pharmaceutical, food and beverage, water and wastewater, pulp and paper, utility power, mining, metals; and/or critical infrastructures.

In implementations, the I/O module 108 may be configured to convert analog data received from the sensor 118 to digital data (e.g., using Analog-to-Digital Converter (ADC) circuitry, and so forth). An I/O module 108 may also be connected to a motor 120 and configured to control one or more operating characteristics of the motor 120, such as motor speed, motor torque, and so forth. Further, the I/O module 108 may be configured to convert digital data to analog data for transmission to the motor 120 (e.g., using Digital-to-Analog (DAC) circuitry, and so forth). In implementations, one or more of the I/O modules 108 may comprise a communications module configured for communicating via a communications sub-bus, such as an Ethernet bus, an H1 field bus, a Process Field Bus (PROFIBUS), a Highway Addressable Remote Transducer (HART) bus, a Modbus, and so forth. Further, two or more of the I/O modules 108 can be used to provide fault tolerant and redundant connections for a communications sub-bus.

Each I/O module 108 may be provided with a unique identifier (ID) for distinguishing one I/O module 108 from another I/O module 108. In implementations, an I/O module 108 may be identified by its ID when it is connected to the communications control system 100. Multiple I/O modules 108 can be used with the communications control system 100 to provide redundancy. For example, two or more I/O modules 108 can be connected to the sensor 118 and/or the motor 120, as described in FIG. 1. Each I/O module 108 can include one or more ports 122 furnishing a physical connection to hardware and circuitry included with the I/O module 108, such as a Printed Circuit Board (PCB) 124, and so forth.

One or more of the I/O modules 108 may include an interface for connecting to other networks, including but not necessarily limited to: a wide-area cellular telephone network, such as a 3G cellular network, a 4G cellular network, or a Global System for Mobile communications (GSM) network; a wireless computer communications network, such as a Wi-Fi network (e.g., a Wireless LAN (WLAN) operated using IEEE 802.11 network standards); a Personal Area Network (PAN) (e.g., a Wireless PAN (WPAN) operated using IEEE 802.15 network standards); a Wide Area Network (WAN); an intranet; an extranet; an internet; the Internet; and so on. Further, one or more of the I/O modules 108 may include a connection for connecting an I/O module 108 to a computer bus, and so forth.

The switch fabric 102 may be coupled with one or more communications/control modules 114 for monitoring and controlling the I/O modules 108, and for connecting the I/O modules 108 together. The communications/control module(s) 114 may be used to configure the cross switch 112. For example, a communications/control module 114 may update a routing table when an I/O module 108 is connected to the communications control system 100 based upon a unique ID for the I/O module 108. Further, when multiple redundant I/O modules 108 are used, each communications/control module 114 can implement mirroring of informational databases regarding the I/O modules 108 and update them as data is received from and/or transmitted to the I/O modules 108. In some implementations, two or more communications/control modules 114 may be used to provide redundancy.

Data transmitted using the switch fabric 102 may be packetized, i.e., discrete portions of the data may be converted into data packets comprising the data portions along with network control information, and so forth. The communications control system 100 may use one or more protocols for data transmission, including a bit-oriented synchronous data link layer protocol such as High-Level Data Link Control (HDLC). In a specific instance, the communications control system 100 may implement HDLC according to an International Organization for Standardization (ISO) 13239 standard, or the like. Further, two or more communications/control modules 114 can be used to implement redundant HDLC. However, it should be noted that HDLC is provided by way of example only and is not meant to be restrictive of the present disclosure. Thus, the communications control system 100 may use other various communications protocols in accordance with the present disclosure.

One or more of the communications/control modules 114 may be configured for exchanging information with components used for monitoring and/or controlling the instrumentation connected to the switch fabric 102 via the I/O modules 108, such as one or more control loop feedback mechanisms/controllers 126. In implementations, a controller 126 can be configured as a microcontroller/Programmable Logic Controller (PLC), a Proportional-Integral-Derivative (PID) controller, and so forth. One or more of the communications/control modules 114 may include a network interface 128 for connecting the communications control system 100 to a controller 126 via a network 130. In implementations, the network interface 128 may be configured as a Gigabit Ethernet interface for connecting the switch fabric 102 to a Local Area Network (LAN). Further, two or more communications/control modules 114 can be used to implement redundant Gigabit Ethernet. However, it should be noted that Gigabit Ethernet is provided by way of example only and is not meant to be restrictive of the present disclosure. Thus, the network interface 128 may be configured for connecting the communications control system 100 to other various networks, including but not necessarily limited to: a wide-area cellular telephone network, such as a 3G cellular network, a 4G cellular network, or a Global System for Mobile communications (GSM) network; a wireless computer communications network, such as a Wi-Fi network (e.g., a Wireless LAN (WLAN) operated using IEEE 802.11 network standards); a Personal Area Network (PAN) (e.g., a Wireless PAN (WPAN) operated using IEEE 802.15 network standards); a Wide Area Network (WAN); an intranet; an extranet; an internet; the Internet; and so on. Additionally, the network interface 128 may be implemented using computer bus. For example, the network interface 128 can include a Peripheral Component Interconnect (PCI) card interface, such as a Mini PCI interface, and so forth. Further, the network 130 may be configured to include a single network or multiple networks across different access points.

The communications control system 100 may include one or more power modules 132 for supplying electrical power to field devices via the I/O modules 108. One or more of the power modules 132 may include an AC-to-DC (AC/DC) converter for converting Alternating Current (AC) (e.g., as supplied by AC mains, and so forth) to Direct Current (DC) for transmission to a field device, such as the motor 120 (e.g., in an implementation where the motor 120 comprises a DC motor). Two or more power modules 132 can be used to provide redundancy. For example, as shown in FIG. 1, two power modules 132 can be connected to each of the I/O modules 108 using a separate power backplane 134 for each power module 132.

The communications control system 100 may be implemented using a support frame 136. The support frame 136 may be used to support and/or interconnect the communications/control module(s) 114, the power module(s) 132, the switch fabric 102, the power backplane(s) 134, and/or the I/O modules 108. The circuit board 116 may be mounted to the support frame 136 using a fastener such as, for example, double sided tape, adhesive, or mechanical fasteners (e.g., screws, bolts, etc.). The support frame 136 may include slots 138 to provide registration for the I/O modules 108, such as for aligning connectors of the I/O modules 108 with connectors included with the circuit board 116 and/or connectors of a power backplane 134. For example, an I/O module 108 may include connectors 140 having tabs/posts 142 for inserting into slots 138 and providing alignment of the I/O module 108 with respect to the circuit board 116. In implementations, one or more of the connectors 140 may be constructed from a thermally conductive material (e.g., metal) connected to a thermal plane of PCB 124 to conduct heat generated by components of the PCB 124 away from the PCB 124 and to the support frame 136, which itself may be constructed of a thermally conductive material (e.g., metal). Further, the communications control system 100 may associate a unique physical ID with each physical slot 138 to uniquely identify each I/O module 108 coupled with a particular slot 138. For example, the ID of a particular slot 138 can be associated with an I/O module 108 coupled with the slot 138 and/or a second ID uniquely associated with the I/O module 108. Further, the ID of a particular I/O module 108 can be used as the ID for a slot 138 when the I/O module 108 is coupled with the slot 138. The support frame 136 can be constructed for cabinet mounting, rack mounting, wall mounting, and so forth.

It should be noted that while the communications control system 100 is described in the accompanying figures as including one switch fabric 102, more than one switch fabric 102 may be provided with communications control system 100. For example, two or more switch fabrics 102 may be used with the communications control system 100 (e.g., to provide physical separation between redundant switch fabrics 102, and so forth). Each one of the switch fabrics 102 may be provided with its own support frame 136. Further, while both the serial communications interface 104 and the parallel communications interface 106 are described as included in a single switch fabric 102, it will be appreciated that physically separate switch fabrics may be provided, where one switch fabric includes the serial communications interface 104, and another switch fabric includes the parallel communications interface 106.

Example Process

Referring now to FIG. 9, example techniques for furnishing communication between multiple input/output devices and one or more communications/control modules using a communications control system that includes a serial communications interface and a parallel communications interface for coupling a plurality of input/output modules with a control module are described.

FIG. 9 depicts a process 900, in an example implementation, for furnishing a communications control system, such as the communications control system 100 illustrated in FIGS. 1 through 8 and described above. In the process 900 illustrated, input/output modules are coupled with a control module (Block 910). For example, with reference to FIGS. 1 through 8, the switch fabric 102 may be configured for connecting the I/O modules 108 to the communications/control modules 114, and transmitting data to and from the I/O modules 108. The input/output modules are connected to the control module in parallel for transmitting information between the input/output modules and the control module (Block 920). In one or more implementations, the input/output modules can be connected to the control module using a multidrop bus (Block 922). For instance, with continuing reference to FIGS. 1 through 8, the serial communications interface 104 of the switch fabric 102 may be implemented using a multidrop bus 110. The input/output modules are separately connected to the control module for transmitting information between the input/output modules and the control module, and for transmitting information between individual ones of the input/output modules (Block 930). In one or more implementations, the input/output modules can be separately connected to the control module using a cross switch (Block 932). For example, with continuing reference to FIGS. 1 through 8, the parallel communications interface 106 of the switch fabric 102 may be implemented using a cross switch 112 comprising a four (4) wire full duplex system with a dedicated connection to each I/O module 108.

In some implementations, the input/output modules are coupled with a redundant control module (Block 940). The input/output modules can be connected to the redundant control module in parallel (Block 950). The input/output devices can also be separately connected to the redundant control module (Block 960). For instance, with continuing reference to FIGS. 1 through 8, two or more communications/control modules 114 can be used to implement a redundant HDLC data link layer protocol. It should be noted that connecting the input/output modules to one redundant control module is provided by way of example only and is not meant to be restrictive of the present disclosure. Thus, the input/output modules may be connected to more than one redundant control module in parallel and/or separately.

In some implementations, the control module can be coupled with a network for transmitting information collected from the input/output modules via the network (Block 970). For example, with continuing reference to FIGS. 1 through 8, one or more of the communications/control modules 114 may include a network interface 128 for connecting the communications control system 100 to a controller 126 via a network 130. The input/output modules can also be coupled with a power module for supplying electrical power to the input/output modules (Block 980). For instance, with continuing reference to FIGS. 1 through 8, one or more power modules 132 may be included with the communications control system 100 for supplying electrical power to field devices via the I/O modules 108.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A communications control system comprising:
a control module;
a plurality of input/output modules coupled with the control module;
a serial communications interface configured for connecting the plurality of input/output modules to the control module in parallel, the serial communications interface configured for transmitting information between the plurality of input/output modules and the control module;

a parallel communications interface configured for separately connecting the plurality of input/output modules to the control module, the parallel communications interface configured for transmitting information between the plurality of input/output modules and the control module, and transmitting information between individual ones of the plurality of input/output modules; and a support frame to facilitate interconnection of the plurality of input/output modules and the control module, the support frame comprising a plurality of slots, each slot of the plurality of slots for receiving a respective one of the plurality of input/output modules, wherein the control module is configured to assign each input/output module a unique identifier associated with a physical location where the input/output module is physically connected to the control module.

2. The communications control system as recited in claim 1, wherein the serial communications interface comprises a multidrop bus.

3. The communications control system as recited in claim 1, wherein the parallel communications interface comprises a cross switch.

4. The communications control system as recited in claim 1, wherein the serial communications interface is configured for connecting the plurality of input/output modules to a redundant control module in parallel, and the parallel communications interface is configured for separately connecting the plurality of input/output modules to the redundant control module.

5. The communications control system as recited in claim 1, wherein information transmitted via at least one of the serial communications interface or the parallel communications interface is packetized.

6. The communications control system as recited in claim 1, wherein the control module comprises a network interface for transmitting information collected from the plurality of input/output modules via a network.

7. The communications control system as recited in claim 1, further comprising a power module for supplying electrical power to at least one of the plurality of input/output modules.

8. A process comprising:
coupling a plurality of input/output modules with a control module using a support frame to facilitate interconnection of the plurality of input/output modules and the control module, the support frame comprising a plurality of slots, each slot of the plurality of slots for receiving a respective one of the plurality of input/output modules;
connecting the plurality of input/output modules to the control module in parallel for transmitting information between the plurality of input/output modules and the control module;
separately connecting the plurality of input/output modules to the control module for transmitting information between the plurality of input/output modules and the control module, and transmitting information between individual ones of the plurality of input/output modules; and
assigning each input/output module a unique identifier associated with a physical location where the input/output module is physically connected to the control module.

9. The process as recited in claim 8, wherein connecting the plurality of input/output modules to the control module in parallel comprises connecting the plurality of input/output modules to the control module using a multidrop bus.

10. The process as recited in claim 8, wherein separately connecting the plurality of input/output modules to the control module comprises separately connecting the plurality of input/output modules to the control module using a cross switch.

11. The process as recited in claim 8, further comprising:
coupling the plurality of input/output modules with a redundant control module;
connecting the plurality of input/output modules to the redundant control module in parallel; and
separately connecting the plurality of input/output modules to the redundant control module.

12. The process as recited in claim 8, wherein at least one of transmitting information between the plurality of input/output modules and the control module or transmitting information between individual ones of the plurality of input/output modules comprises packetizing the transmitted information.

13. The process as recited in claim 8, further comprising coupling the control module with a network for transmitting information collected from the plurality of input/output modules via the network.

14. The process as recited in claim 8, further comprising coupling at least one of the plurality of input/output modules with a power module for supplying electrical power to the at least one of the plurality of input/output modules.

15. A communications control system comprising:
a control module;
a plurality of input/output modules coupled with the control module;
a multidrop bus configured for connecting the plurality of input/output modules to the control module in parallel, the multidrop bus configured for transmitting information between the plurality of input/output modules and the control module;
a cross switch configured for separately connecting the plurality of input/output modules to the control module, the cross switch configured for transmitting information between the plurality of input/output modules and the control module, and transmitting information between individual ones of the plurality of input/output modules; and
a support frame to facilitate interconnection of the plurality of input/output modules and the control module, the support frame comprising a plurality of slots, each slot of the plurality of slots for receiving a respective one of the plurality of input/output modules, wherein the control module is configured to assign each input/output module a unique identifier associated with a physical location where the input/output module is physically connected to the control module.

16. The communications control system as recited in claim 15, wherein the multidrop bus is configured for connecting the plurality of input/output modules to a redundant control module in parallel, and the cross switch is configured for separately connecting the plurality of input/output modules to the redundant control module.

17. The communications control system as recited in claim 15, wherein information transmitted via at least one of the multidrop bus or the cross switch is packetized.

* * * * *